US012587610B2

(12) United States Patent
Akiba

(10) Patent No.: US 12,587,610 B2
(45) Date of Patent: Mar. 24, 2026

(54) CIRCUIT APPARATUS AND DISPLAY SYSTEM

(71) Applicant: SEIKO EPSON CORPORATION, Tokyo (JP)

(72) Inventor: Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 19/001,841

(22) Filed: Dec. 26, 2024

(65) Prior Publication Data

US 2025/0220135 A1     Jul. 3, 2025

(30) Foreign Application Priority Data

Dec. 27, 2023     (JP) ................................. 2023-220249

(51) Int. Cl.
*H04N 7/088* (2006.01)
*H04N 5/06* (2006.01)
*H04N 7/01* (2006.01)

(52) U.S. Cl.
CPC ............. *H04N 7/0881* (2013.01); *H04N 5/06* (2013.01); *H04N 7/0127* (2013.01)

(58) Field of Classification Search
CPC ...... H04N 7/0881; H04N 7/0127; H04N 5/04; H04N 5/06; H04N 5/268; G09G 2340/00; G09G 2340/14; G09G 2340/0435; G09G 2310/10; G09G 5/12; G09G 6/005; G09G 2370/20

See application file for complete search history.

(56) References Cited

U.S. PATENT DOCUMENTS

| | | | | | |
|---|---|---|---|---|---|
| 5,978,041 | A | * | 11/1999 | Masuda ................. | H04N 21/47 |
| | | | | | 348/565 |
| 6,353,460 | B1 | * | 3/2002 | Sokawa ................... | H04N 5/45 |
| | | | | | 386/E5.067 |
| 7,667,774 | B2 | * | 2/2010 | Murakami ............... | H04N 5/04 |
| | | | | | 348/706 |
| 8,111,334 | B2 | * | 2/2012 | Mizutani ............... | H04N 5/268 |
| | | | | | 348/706 |
| 8,223,267 | B2 | * | 7/2012 | Terajima ............... | G09G 5/393 |
| | | | | | 348/706 |
| 8,326,291 | B2 | * | 12/2012 | Seo ........................ | H04H 20/26 |
| | | | | | 348/438.1 |
| 8,896,756 | B2 | * | 11/2014 | Funada .................... | H04N 5/50 |
| | | | | | 348/706 |
| 11,568,780 | B2 | * | 1/2023 | Akiba ...................... | G09G 3/20 |

(Continued)

FOREIGN PATENT DOCUMENTS

| | | |
|---|---|---|
| JP | 2004-222033 A | 8/2004 |
| JP | 2016-187079 A | 10/2016 |

*Primary Examiner* — Brian P Yenke
(74) *Attorney, Agent, or Firm* — Harness, Dickey & Pierce, P.L.C.

(57)     ABSTRACT

A first selection circuit switches from first image data to switching image data in a vertical blanking period of the first image data. An output circuit outputs output image data at a frame rate different from that of second image data in a switching period in which the switching image data is selected by the first selection circuit. The first selection circuit switches from the switching image data to the second image data in an overlap period between a vertical blanking period of the switching image data and a vertical blanking period of the second image data.

10 Claims, 12 Drawing Sheets

(56) References Cited

U.S. PATENT DOCUMENTS

| | | | | |
|---|---|---|---|---|
| 2004/0003399 A1* | 1/2004 | Cooper | .................... | H04N 5/50 |
| | | | | 725/38 |
| 2006/0139488 A1* | 6/2006 | Suzuki | ..................... | B60R 1/26 |
| | | | | 348/E5.053 |
| 2011/0234800 A1* | 9/2011 | Terasaki | ................... | H04N 5/04 |
| | | | | 348/148 |
| 2011/0249089 A1* | 10/2011 | Uemura | .............. | H04N 13/167 |
| | | | | 348/43 |
| 2020/0335062 A1* | 10/2020 | Huard | ..................... | G09G 5/18 |
| 2024/0169886 A1* | 5/2024 | Akiba | ................... | G06F 3/1446 |
| 2025/0218342 A1* | 7/2025 | Akiba | ................... | G09G 5/005 |

* cited by examiner

DISPLAY SYSTEM 300

CIRCUIT APPARATUS 100

DISPLAY APPARATUS 200

IMQ

IMA

IMB

FIRST APPARATUS 10

SECOND APPARATUS 20

Figure 2:
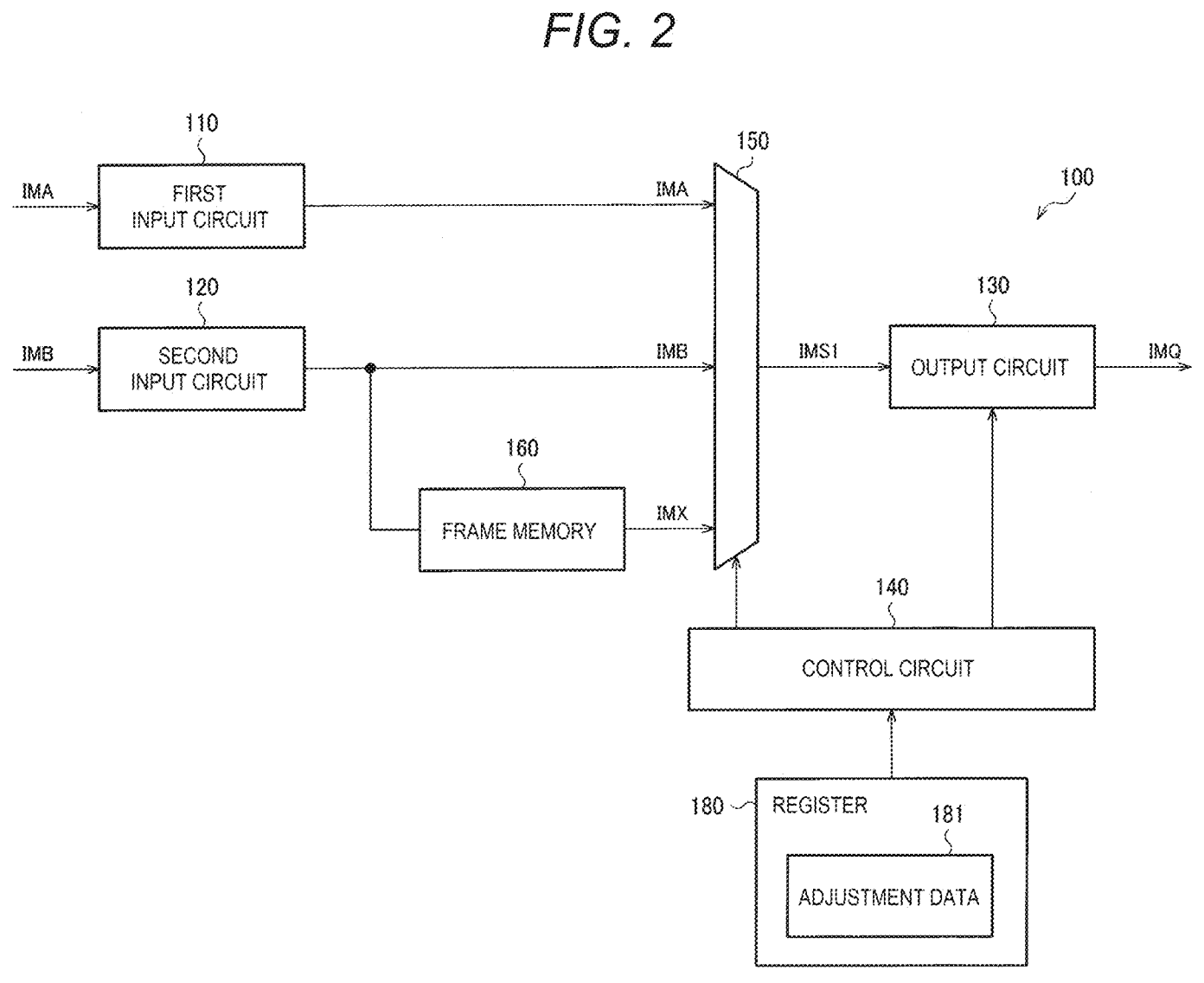

IMA → FIRST INPUT CIRCUIT 110 → IMA

IMB → SECOND INPUT CIRCUIT 120 → IMB

150

IMA
IMB
IMX

FRAME MEMORY 160

IMS1 → OUTPUT CIRCUIT 130 → IMQ

CONTROL CIRCUIT 140

REGISTER 180

ADJUSTMENT DATA 181

*FIG. 3*

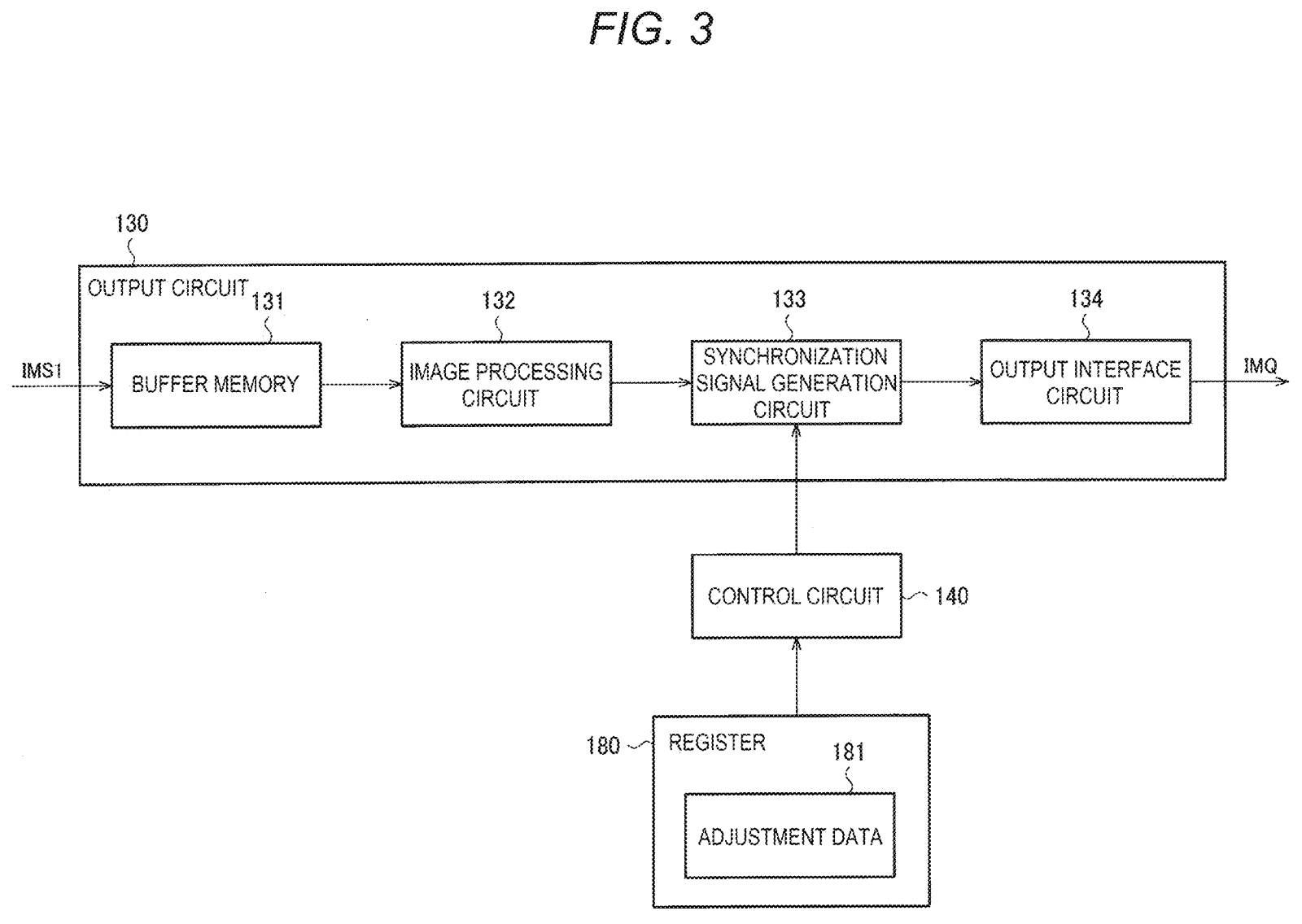

IMQ

130 OUTPUT CIRCUIT

131 BUFFER MEMORY

IMSI

132 IMAGE PROCESSING CIRCUIT

133 SYNCHRONIZATION SIGNAL GENERATION CIRCUIT

134 OUTPUT INTERFACE CIRCUIT

140 CONTROL CIRCUIT

180 REGISTER

181 ADJUSTMENT DATA

CIRCUIT APPARATUS AND DISPLAY SYSTEM

The present application is based on, and claims priority from JP Application Serial Number 2023-220249, filed Dec. 27, 2023, the disclosure of which is hereby incorporated by reference herein in its entirety.

BACKGROUND

1. Technical Field

The present disclosure relates to a circuit apparatus, a display system, and the like.

2. Related Art

JP-A-2016-187079 discloses a display system including a switching circuit for switching an asynchronous video signal. The switching circuit outputs a video signal synchronized with a vertical synchronization signal VS3 in a certain period after power is turned on, and outputs a synthesized video signal synchronized with a vertical synchronization signal VS4 after a switching signal is switched.

In JP-A-2016-187079, since the vertical synchronization signal VS3 and the vertical synchronization signal VS4 are not synchronized, there is a problem that synchronization continuity is compromised at the time of switching the video signal. That is, there is no synchronization continuity between a last synchronization timing of the vertical synchronization signal VS3 before switching and a first synchronization timing of the vertical synchronization signal VS4 after switching. In a display apparatus that receives image data without synchronization continuity, synchronization is unstable and an image is distorted, or a measure is implemented such as displaying black in a period in which there is no synchronization continuity, which may lead to low display visual quality.

SUMMARY

An aspect of the disclosure relates to a circuit apparatus including: a first input circuit configured to receive first image data; a second input circuit configured to receive second image data; a frame memory configured to store the second image data as switching image data; a first selection circuit configured to select any of the first image data, the second image data, and the switching image data and output the selected image data as first selected image data; an output circuit configured to output image data based on the first selected image data; and a control circuit, in which the control circuit controls the first selection circuit to switch from the first image data to the switching image data in a vertical blanking period of the first image data, controls the output circuit to output the output image data at a frame rate different from a frame rate of the second image data in a switching period in which the switching image data is selected by the first selection circuit, and controls the first selection circuit to switch from the switching image data to the second image data in an overlap period between a vertical blanking period of the switching image data and a vertical blanking period of the second image data.

Another aspect of the disclosure relates to a display system including: the above-described circuit apparatus; and a display apparatus configured to display an image based on the output image data.

BRIEF DESCRIPTION OF THE DRAWINGS

FIG. 1 is a configuration example of an electronic device and a display system.

FIG. 2 shows a first configuration example of a circuit apparatus.

FIG. 3 shows a detailed configuration example of an output circuit.

FIG. 5 shows a second configuration example of the circuit apparatus.

FIG. 6 shows a third configuration example of the circuit apparatus.

FIG. 7 shows an example of image data whose frame rate is not adjusted.

FIG. 9 shows a second example of the frame rate adjustment.

FIG. 10 shows a third example of the frame rate adjustment.

FIG. 11 shows a fourth example of the frame rate adjustment.

FIG. 12 shows a fifth example of the frame rate adjustment.

DESCRIPTION OF EMBODIMENTS

Figure 4:
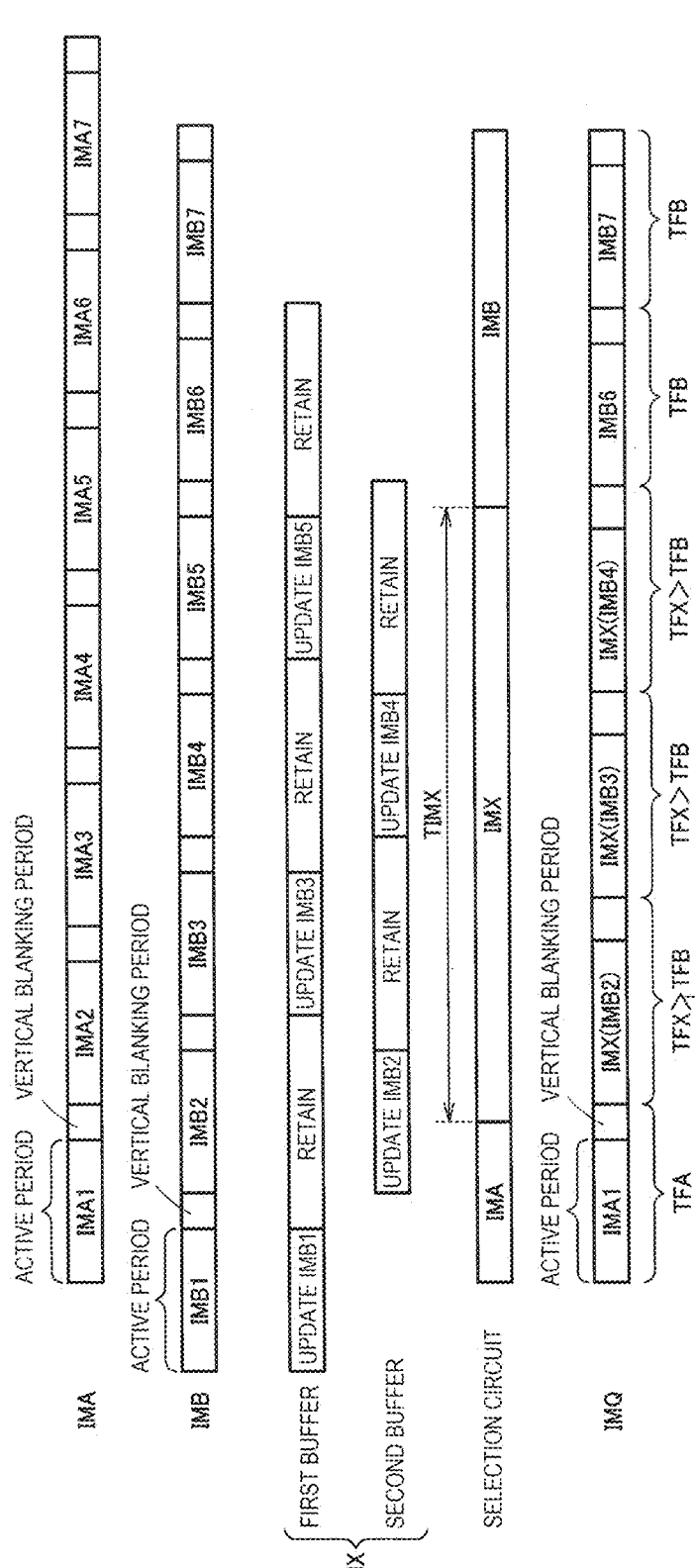
FIG. 4 is a timing chart showing an operation of the circuit apparatus.

A preferred embodiment of the disclosure will be described in detail below. The embodiment described below does not unduly limit the content described in the claims. Not all of configurations described in the embodiment are essential constituent elements.

1. Electronic Device and Display System

Figure 1:
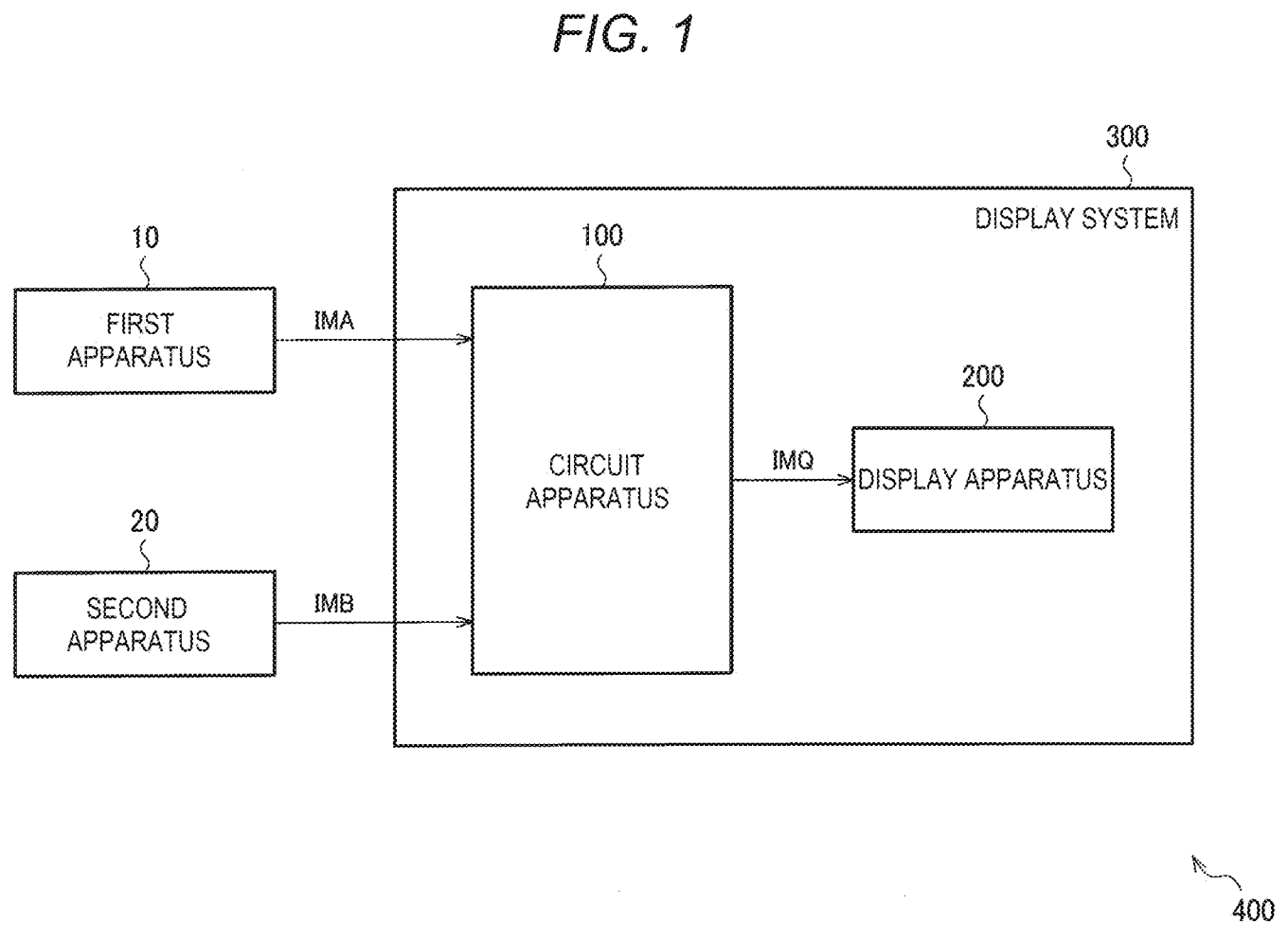

FIG. 1 is a configuration example of an electronic device and a display system. An electronic device 400 includes a first apparatus 10, a second apparatus 20, and a display system 300. The display system 300 includes a circuit apparatus 100 and a display apparatus 200.

Each of the first apparatus 10 and the second apparatus 20 is an apparatus that transmits image data to the circuit apparatus 100. Examples of such an apparatus include a camera, a relay, a splitter, and a microprocessor. The camera captures an image and transmits image data thereof. The relay is an apparatus that buffers received image data and the like. The splitter is an apparatus that divides and received transmits image data. The microprocessor transmits image data read from a memory, for example, or performs image processing on image data read from the memory or received from outside and transmits the image data.

The first apparatus 10 transmits first image data IMA. The second apparatus 20 transmits second image data IMB asynchronously with the first image data IMA. Being asynchronous means that display timings of the first image data IMA and the second image data IMB are not synchronized. Specifically, a timing control signal, such as a dot clock, a vertical synchronization signal, or a horizontal synchronization signal, of the first image data IMA, and a timing control signal of the second image data IMB are independently generated.

The circuit apparatus 100 receives the first image data IMA from the first apparatus 10, receives the second image data IMB from the second apparatus 20, switches the first image data IMA and the second image data IMB, and outputs the switched image data as output image data IMQ. The circuit apparatus 100 is, for example, an integrated circuit apparatus in which a plurality of circuit elements are integrated at a semiconductor substrate. The circuit apparatus 100 is, for example, a dedicated IC for video switching, an IC that performs image processing such as overlay or distortion correction in addition to video switching, or an IC incorporating a function of a display controller in addition to video switching.

The display apparatus 200 receives the output image data IMQ and displays an image corresponding to the output image data IMQ. The display apparatus 200 is, for example, an in-vehicle display apparatus such as a head-up display, a center information display, a cluster panel, a navigation system, or an electronic mirror. Alternatively, the display apparatus 200 may be a television apparatus or a monitor of an information processing terminal. The display apparatus 200 includes a display panel and a display driver that drives the display panel. When the display apparatus 200 is a head-up display, the display apparatus 200 may include a projection optical system that projects an image to be displayed on the display panel and a projection light source.

As an example, the electronic device 400 is an in-vehicle device, the first apparatus 10 is an SoC that outputs a navigation image, the second apparatus 20 is an in-vehicle camera such as a rear-view camera, and the display apparatus 200 is a head-up display or a center information display that displays information for a passenger. At this time, when a shift lever is switched to reverse gear, the circuit apparatus 100 may switch the output image data IMQ from the navigation image or the like to an image of the rear-view camera or the like based on shift lever operation information.

2. Circuit Apparatus

FIG. 2 shows a first configuration example of the circuit apparatus. The circuit apparatus 100 includes a first input circuit 110, a second input circuit 120, an output circuit 130, a control circuit 140, a first selection circuit 150, a frame memory 160, and a register 180.

The first input circuit 110 is an image interface circuit, receives the first image data IMA, and converts the received first image data IMA into a format used inside the circuit apparatus 100. An image interface standard may be various, such as a standard where image data and a timing control signal are transmitted and received as separate signals, a standard where all or a part of timing control signals are embedded in image data, a standard where a timing control signal is demodulated from image data, and a standard where image data and a timing control signal are transmitted and received via packet communication. The image interface standard is, for example, Open LVDS Display Interface, DisplayPort, or Mobile Industry Processor Interface Display Serial Interface 2. The image data format used inside the circuit apparatus 100 may be various as described above, and one example is a format where RGB image data and a timing control signal are transmitted as separate signals. The timing control signal includes, for example, a dot clock, a horizontal synchronization signal, and a vertical synchronization signal. Hereinafter, simply referred to as the first image data IMA, including the timing control signal. The same applies to the second image data IMB and the output image data IMQ.

The second input circuit 120 is an image interface circuit, receives the second image data IMB, and converts the received second image data IMB into the format used inside the circuit apparatus 100. The first image data IMA and the second image data IMB are asynchronous with each other. Being asynchronous means that timing control signals are not synchronized with each other, and for example, synchronization timings of vertical synchronization signals are independent of each other, or frame rates are different. The image interface standard and the image data format used inside the circuit apparatus 100 are as described in the first input circuit 110. However, the image interface standard of the second input circuit 120 may be different from the image interface standard of the first input circuit 110.

The frame memory 160 buffers the second image data IMB received by the second input circuit 120 and outputs the buffered second image data IMB as switching image data IMX. As an example, the frame memory 160 has a double-buffer configuration and includes a first buffer and a second buffer each of which holds one frame. However, when writing and reading of a frame do not interfere with each other, the frame memory 160 may be a single buffer. The embodiment described in FIG. 4 and the like is described as a double-buffer configuration, and alternatively, the frame memory 160 may have a triple-buffer configuration with capacity for three images.

The first selection circuit 150 selects any of the first image data IMA, the second image data IMB, and the switching image data IMX, and outputs the selected image data as first selected image data IMS1. When the first image data IMA is switched to the second image data IMB, the first selection circuit 150 selects the first image data IMA, the switching image data IMX, and the second image data IMB in this order.

The output circuit 130 outputs the output image data IMQ based on the first selected image data IMS1. The output circuit 130 adjusts a frame rate of the switching image data IMX such that the first image data IMA, the switching image data IMX, and the second image data IMB are switched in a vertical blanking period.

The register 180 stores adjustment data 181 for adjusting the frame rate of the switching image data IMX. For example, an external processing apparatus of the circuit apparatus 100 writes the adjustment data 181 to the register 180 via an interface circuit (not shown). Alternatively, the circuit apparatus 100 may include a non-volatile memory (not shown) that stores the adjustment data 181, and the adjustment data 181 may be loaded from the non-volatile memory to the register 180.

The control circuit 140 controls the first selection circuit 150 and the output circuit 130 based on the adjustment data 181 stored in the register 180. Specifically, the control circuit 140 controls an image data selection timing of the first selection circuit 150 and frame rate adjustment of the output circuit 130 based on a frame rate indicated in the adjustment data 181.

FIG. 3 shows a detailed configuration example of the output circuit. The output circuit 130 includes a buffer memory 131, an image processing circuit 132, a synchronization signal generation circuit 133, and an output interface circuit 134. The configuration of the output circuit 130 is not limited to that in FIG. 3, and for example, the image processing circuit 132 may be omitted.

The buffer memory 131 buffers the first selected image data IMS1. The buffer memory 131 absorbs a rate difference generated when the synchronization signal generation circuit 133 adjusts a frame rate, for example.

The image processing circuit 132 performs image processing on image data from the buffer memory 131. The image processing circuit 132 performs image processing on a part or all of the first image data IMA, the switching image data IMX, and the second image data IMB. An example of the image processing is processing of overlaying a predetermined image such as an icon on the image data from the buffer memory 131. However, the image processing may be various, and for example, may be gamma correction or color adjustment. Hereinafter, the image data after the image processing will be referred to as the first image data IMA, the switching image data IMX, and the second image data IMB.

The synchronization signal generation circuit 133 generates a synchronization signal of the output image data IMQ. Specifically, the synchronization signal of the output image data IMQ is generated based on a dot clock used inside the circuit apparatus 100. At this time, when the switching image data IMX is received from the image processing circuit 132, the synchronization signal generation circuit 133 adjusts the frame rate of the switching image data IMX. Specifically, the synchronization signal generation circuit 133 generates the synchronization signal such that the frame rate of the switching image data IMX is lower than a frame rate of the second image data IMB. When the first image data IMA or the second image data IMB is received from the image processing circuit 132, the synchronization signal generation circuit 133 generates the synchronization signal such that the frame rate of such image data is not changed.

The output interface circuit 134 uses the synchronization signal generated by the synchronization signal generation circuit 133 to output the first image data IMA, the switching image data IMX, or the second image data IMB as the output image data IMQ. The output interface circuit 134 is an image interface circuit and performs conversion from the image data format used inside the circuit apparatus 100 to a transmission standard of the output image data IMQ. The image interface standard and the image data format used inside the circuit apparatus 100 are as described in the first input circuit 110. However, the image interface standard of the output interface circuit 134 may be different from the image interface standards of the first input circuit 110 and the second input circuit 120.

The control circuit 140 controls frame rate adjustment by the synchronization signal generation circuit 133 based on the adjustment data 181. The adjustment data 181 is data indicating at least one of a vertical blanking period and a horizontal blanking period. The synchronization signal generation circuit 133 generates, based on control from the control circuit 140, a horizontal synchronization signal and a vertical synchronization signal of the switching image data IMX to have the blanking period indicated in the adjustment data 181. By changing the blanking period, the total number of pixels in a frame is changed, and thus the frame rate of the switching image data IMX is changed. The adjustment data 181 may be data indicating the blanking period, or may be data indicating an additional period to the blanking period of the switching image data IMX received by the synchronization signal generation circuit 133. Specific examples of how the blanking period is changed will be described with reference to FIG. 7 and the subsequent drawings.

The first selection circuit 150 and the control circuit 140 in FIG. 2, and the image processing circuit 132 and the synchronization signal generation circuit 133 in FIG. 3 are implemented by a logic circuit. Each of the first selection circuit 150, the control circuit 140, the image processing circuit 132, and the synchronization signal generation circuit 133 may be implemented as a separate logic circuit. Alternatively, the logic circuit may be a processor. The circuit apparatus 100 may include a memory (not shown) that stores a program in which processing of each unit of the first selection circuit 150, the control circuit 140, the image processing circuit 132, and the synchronization signal generation circuit 133 is described. The processor may implement the processing of each unit by executing the program.

The processor may include, for example, one or a plurality of a CPU, a GPU, a microcomputer, a DSP, an ASIC, and an FPGA. The CPU is an abbreviation for a central processing unit. The GPU is an abbreviation for a graphics processing unit. The DSP is an abbreviation for a digital signal processor. The ASIC is an abbreviation for an application-specific integrated circuit. The FPGA is an abbreviation for a field-programmable gate array.

FIG. 4 is a timing chart showing an operation of the circuit apparatus. FIG. 4 shows an example in which the first image data IMA and the second image data IMB have the same or substantially the same frame rate and different vertical synchronization timings. FIG. 4 shows an example in which the frame memory 160 has a double-buffer configuration.

Image data in each frame in the first image data IMA is defined as IMA1, IMA2, . . . . The image data is transmitted in a manner of an active period and a vertical blanking period of IMA1, an active period and a vertical blanking period of IMA2, and so on. Similarly, image data in each frame in the second image data IMB is defined as IMB1, IMB2, . . . . The image data is transmitted in a manner of an active period and a vertical blanking period of IMB1, an active period and a vertical blanking period of IMB2, and so on.

The frame memory 160 updates the first buffer with IMB1 in the active period of the IMB1, updates the second buffer with IMB2 in the active period of the IMB2, updates the first buffer with IMB3 in an active period of IMB3, and updates the second buffer with IMB4 in an active period of IMB4. "A buffer is updated with image data" can be rephrased as "writing image data in a buffer". The first buffer and the second buffer retain data written during a most recent update in a non-update period. Hereinafter, the frame memory 160 repeats the same operation.

The first selection circuit 150 selects the first image data IMA, and the output circuit 130 outputs IMA1 as the output image data IMQ. The output circuit 130 does not change a frame period TFA of IMA1 in the output image data IMQ from a frame period of the first image data IMA received by the first input circuit 110.

The first selection circuit 150 switches the first selected image data IMS1 from the first image data IMA to the switching image data IMX in a vertical blanking period between IMA1 and IMA2. A period in which the first selection circuit 150 selects the switching image data IMX is referred to as a switching period TIMX. In the switching period TIMX, the output circuit 130 reads IMB2 from the second buffer and outputs IMB2 as the output image data IMQ, then reads IMB3 from the first buffer and outputs IMB3 as the output image data IMQ, and then reads IMB4 from the second buffer and outputs IMB4 as the output image data IMQ. At this time, the output circuit 130 sets a frame period TFX of IMB2, IMB3, and IMB4 in the output image data IMQ to be longer than a frame period TFB of the second image data IMB received by the second input circuit 120. This corresponds to the frame rate adjustment, and the frame rate is adjusted by adjusting the blanking period as described above.

For example, when IMB2 is read from the second buffer, it is sufficient that the active period of IMB2 in the output image data IMQ is within a period from when an update of the second buffer with the IMB2 is started to when an update with IMB4 is ended. In this way, IMB2 is read from the second buffer without interfering with updating and reading of the second buffer. The output circuit 130 reads from a buffer in which no interference occurs as described above among the first buffer and the second buffer.

Since the frame period TFX of IMB2, IMB3, and IMB4 in the output image data IMQ is longer than the frame period TFB of the second image data IMB received by the second input circuit 120, a time difference between a vertical synchronization timing of the output image data IMQ and a vertical synchronization timing of the second image data IMB is small. When a vertical blanking period of the output image data IMQ overlaps a vertical blanking period of the second image data IMB, the first selection circuit 150 switches from the switching image data IMX to the second image data IMB in this overlap period. In the example in FIG. 4, switching is performed in an overlap period between a vertical blanking period of IMB4 in the output image data IMQ and a vertical blanking period between IMB5 and IMB6 in the second image data IMB.

After the first selection circuit 150 selects the second image data IMB, the output circuit 130 outputs IMB6 and IMB7 as the output image data IMQ. The output circuit 130 does not change the frame period TFB of IMB6 and IMB7 in the output image data IMQ from the frame period of the second image data IMB received by the second input circuit 120.

As described above, the first image data IMA, the switching image data IMX, and the second image data IMB in the output image data IMQ are switched in the vertical blanking period. Accordingly, it is possible to provide a user with an image having high visual quality while avoiding distortion or a non-display period of the image when switching an asynchronous image.

Figure 5:
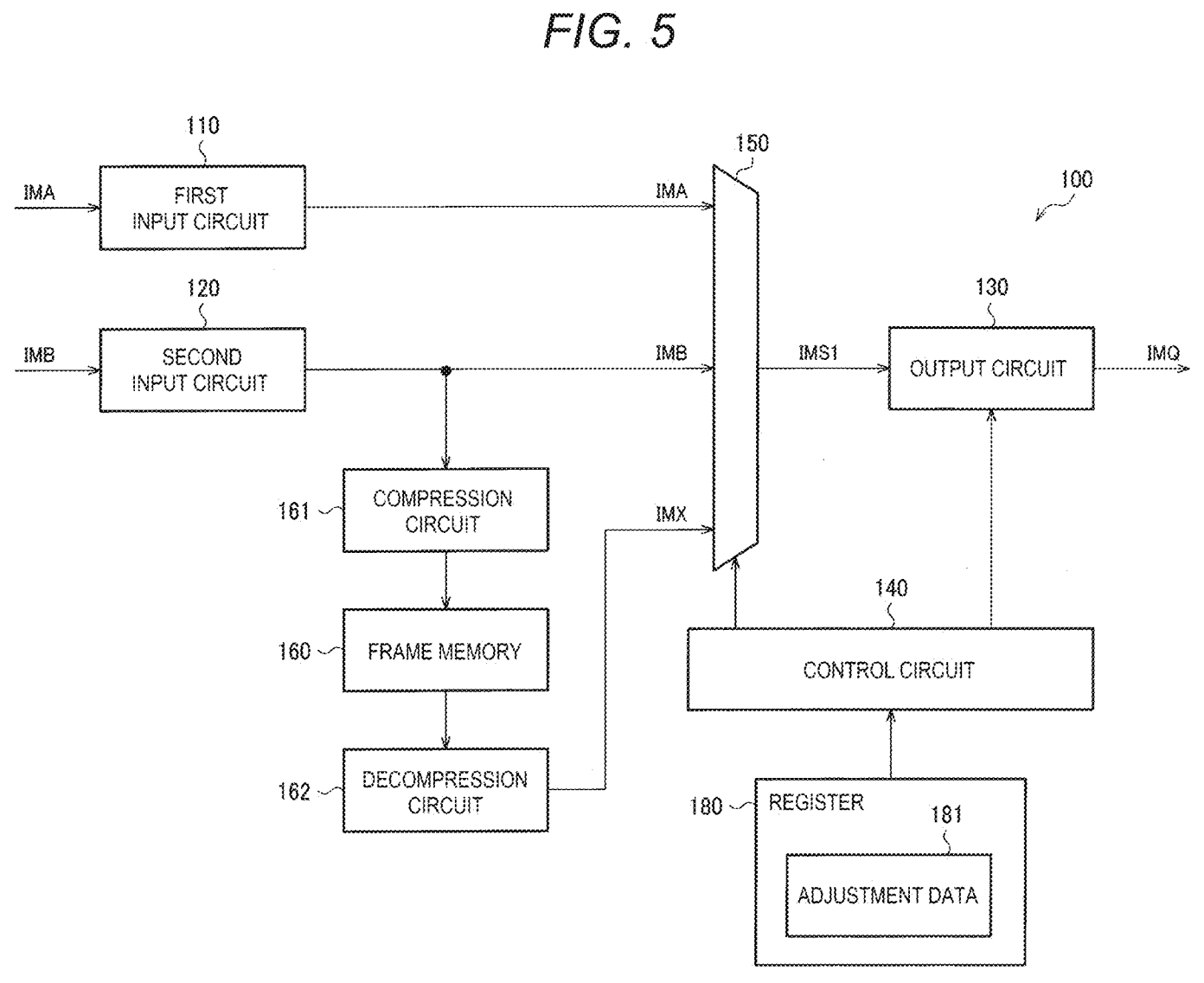

FIG. 5 shows a second configuration example of the circuit apparatus. Hereinafter, portions different from those in the first configuration example will be mainly described, and description of portions similar to those in the first configuration example will be appropriately omitted. The circuit apparatus 100 further includes a compression circuit 161 and a decompression circuit 162.

The compression circuit 161 compresses the second image data IMB and stores the compressed second image data IMB in the frame memory 160 as the switching image data IMX. The decompression circuit 162 decompresses the switching image data IMX read from the frame memory 160 and outputs the decompressed switching image data IMX to the first selection circuit 150. A compression method may be any method as long as image quality of a certain degree is maintained. As an example, the compression circuit 161 and the decompression circuit 162 may compress and decompress image data using an image compression technique such as MPEG. Alternatively, the compression circuit 161 may reduce the number of pixels in the image data by downsampling or binning, and the decompression circuit 162 may restore the number of pixels in the image data by upsampling or the like. By compressing the image data stored in the frame memory 160, capacity of the frame memory 160 can be saved.

Figure 6:
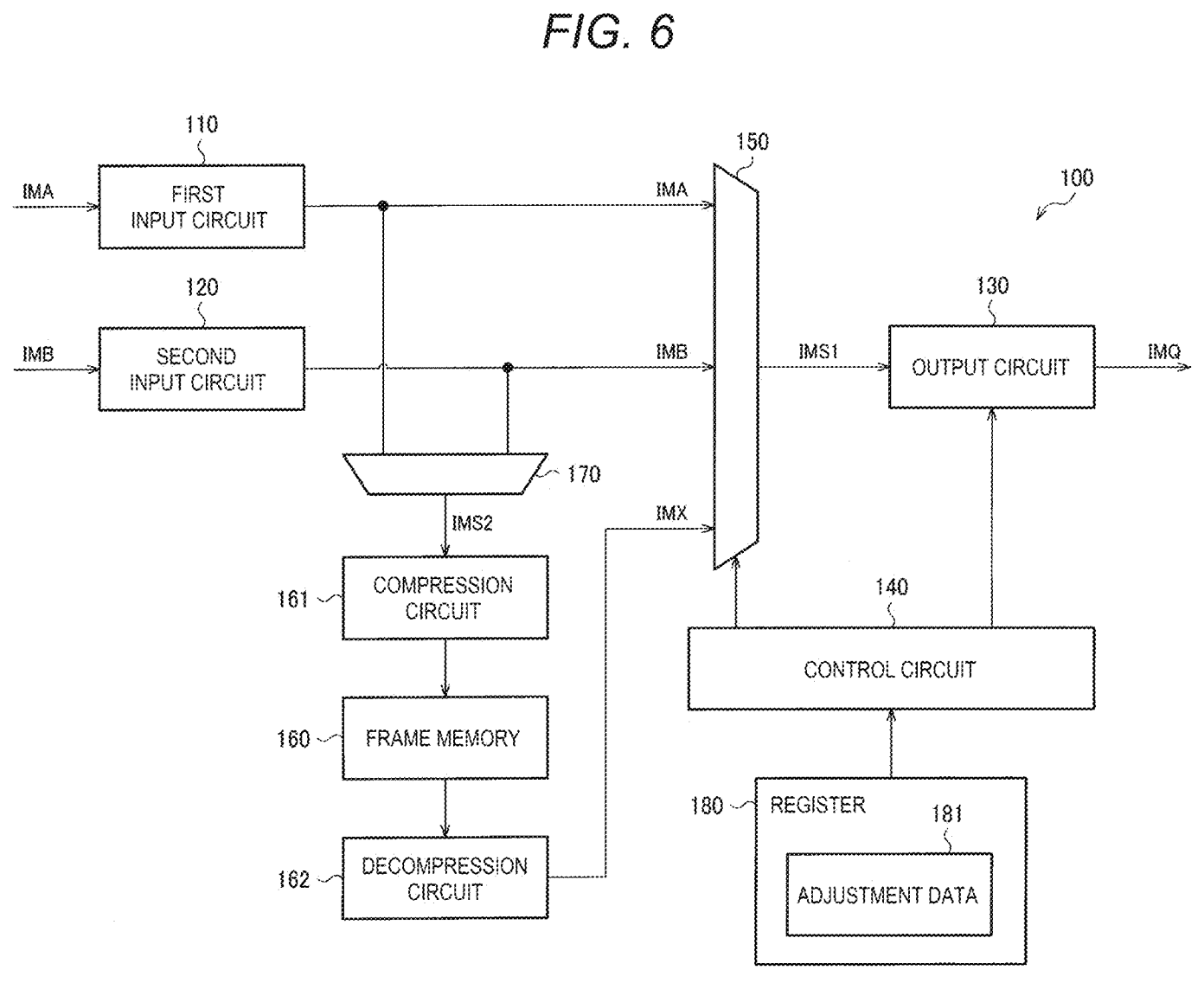

FIG. 6 shows a third configuration example of the circuit apparatus. Hereinafter, portions different from those in the first configuration example and the second configuration example will be mainly described, and description of portions similar to those in the first configuration example and the second configuration example will be appropriately omitted. The circuit apparatus 100 further includes a second selection circuit 170. Here, an example is shown in which the second selection circuit 170 is combined with the second configuration example, and the second selection circuit 170 may also be combined with the first configuration example.

The second selection circuit 170 selects any of the first image data IMA and the second image data IMB, and outputs the selected image data to the compression circuit 161 as second selected image data IMS2. The compression circuit 161 compresses the second selected image data IMS2, and the frame memory 160 stores the compressed second selected image data IMS2 as the switching image data IMX.

When the first selection circuit 150 selects the first image data IMA, the second selection circuit 170 selects the second image data IMB. When the first selection circuit 150 selects the second image data IMB, the second selection circuit 170 selects the first image data IMA. That is, when the output image data IMQ is switched from the first image data IMA to the second image data IMB, the second image data IMB serves as the switching image data IMX. When the output image data IMQ is switched from the second image data IMB to the first image data IMA, the first image data IMA serves as the switching image data IMX.

When the output image data IMQ is switched from the second image data IMB to the first image data IMA, the same operation as the timing chart in FIG. 4 is performed. As an example, if "IMA" and "IMB" are swapped in FIG. 4, this timing chart is a timing chart when the output image data IMQ is switched from the second image data IMB to the first image data IMA.

In the embodiment, the circuit apparatus 100 includes the first input circuit 110 that receives the first image data IMA, the second input circuit 120 that receives the second image data IMB, and the frame memory 160 that stores the second image data IMB as the switching image data IMX. The circuit apparatus 100 includes the first selection circuit 150 that selects any of the first image data IMA, the second image data IMB, and the switching image data IMX and outputs the selected image data as the first selected image data IMS1, the output circuit 130 that outputs the output image data IMQ based on the first selected image data IMS1, and the control circuit 140. As described with reference to FIG. 4, the control circuit 140 controls the first selection circuit 150 to switch from the first image data IMA to the switching image data IMX in the vertical blanking period of the first image data IMA. The control circuit 140 controls the output circuit 130 to output the output image data IMQ at a frame rate different from that of the second image data IMB in the switching period TIMX in which the switching image data IMX is selected by the first selection circuit 150. The control circuit 140 controls the first selection circuit 150 to switch from the switching image data IMX to the second image data IMB in an overlap period between the vertical blanking period of the switching image data IMX and the vertical blanking period of the second image data IMB.

According to the embodiment, in the switching period TIMX, the output image data IMQ is output at a frame rate different from that of the second image data IMB, and thus the time between difference the vertical synchronization timing of the second image data IMB and the vertical synchronization timing of the output image data IMQ is small. When the time difference is small, the overlap period between the vertical blanking period of the switching image data IMX and the vertical blanking period of the second image data IMB occurs. By switching from the switching image data IMX to the second image data IMB in this overlap period, switching of the first image data IMA, the switching image data IMX, and the second image data IMB is performed in the vertical blanking period. Accordingly, it is possible to provide the user with an image having high visual quality while avoiding distortion or a non-display period of the image when switching an asynchronous image.

As described in FIG. 5, the circuit apparatus 100 may include the compression circuit 161 that compresses the second image data IMB. The frame memory 160 may store the second image data IMB compressed by the compression circuit 161 as the switching image data IMX.

The circuit apparatus 100 may include the decompression circuit 162 that decompresses the switching image data IMX stored in the frame memory 160 and outputs the decompressed switching image data IMX to the first selection circuit 150.

According to the embodiment, since the compressed second image data IMB is stored in the frame memory 160, capacity of the frame memory 160 can be saved.

In the embodiment, the control circuit 140 may set the frame rate of the switching image data IMX to a frame rate lower than the frame rate of the second image data IMB.

According to the embodiment, a vertical synchronization timing of the switching image data IMX gradually lags with respect to a vertical synchronization timing of the first image data IMA and thus approaches the vertical synchronization timing of the second image data IMB. When the time difference between the vertical synchronization timings is small, the overlap period between the vertical blanking period of the switching image data IMX and the vertical blanking period of the second image data IMB occurs.

As described in FIG. 6, the circuit apparatus 100 may include the second selection circuit 170 that selects any of the first image data IMA and the second image data IMB and outputs the selected image data as the second selected image data IMS2. The frame memory 160 may store the second selected image data IMS2 as the switching image data IMX.

When switching from the second image data IMB to the first image data IMA by the first selection circuit 150, the second selection circuit 170 may select the first image data IMA as the second selected image data IMS2. The control circuit 140 may control the first selection circuit 150 to switch from the second image data IMB to the switching image data IMX in the vertical blanking period of the second image data IMB. In the switching period, the control circuit 140 may set the frame rate of the switching image data IMX to a frame rate different from that of the first image data IMA. The control circuit 140 may control the first selection circuit 150 to switch from the switching image data IMX to the first image data IMA in an overlap period between the vertical blanking period of the switching image data IMX and the vertical blanking period of the first image data IMA.

According to the embodiment, image switching is performed in the vertical blanking period in both switching from the first image data IMA to the second image data IMB and switching from the second image data IMB to the first image data IMA. Accordingly, it is possible to provide the user with an image having high visual quality while avoiding distortion or a non-display period of the image in bidirectional switching of asynchronous images.

As will be described later with reference to FIGS. 7 to 12, the control circuit 140 may set the frame rate of the switching image data IMX by adjusting a length of the vertical blanking period, a length of the horizontal blanking period, or the length of the vertical blanking period and the length of the horizontal blanking period of the switching image data IMX in the switching period TIMX.

The circuit apparatus 100 may include the register 180 that stores the adjustment data 181 for the frame rate of the switching image data IMX. The control circuit 140 may set the length of the vertical blanking period, the length of the horizontal blanking period, or the lengths of the vertical blanking period and the horizontal blanking period of the switching image data IMX based on the adjustment data 181 in the switching period TIMX.

The frame rate is determined by the total number of pixels in a frame including a blanking area. That is, (total number of horizontal pixels)×(total number of vertical pixels) is the total number of pixels in the frame. According to the embodiment, the total number of horizontal pixels is changed by adjusting the length of the horizontal blanking period, and the total number of vertical pixels is changed by adjusting the length of the vertical blanking period. Accordingly, the total number of pixels in the frame is changed, and the frame rate is adjusted.

Figure 8:
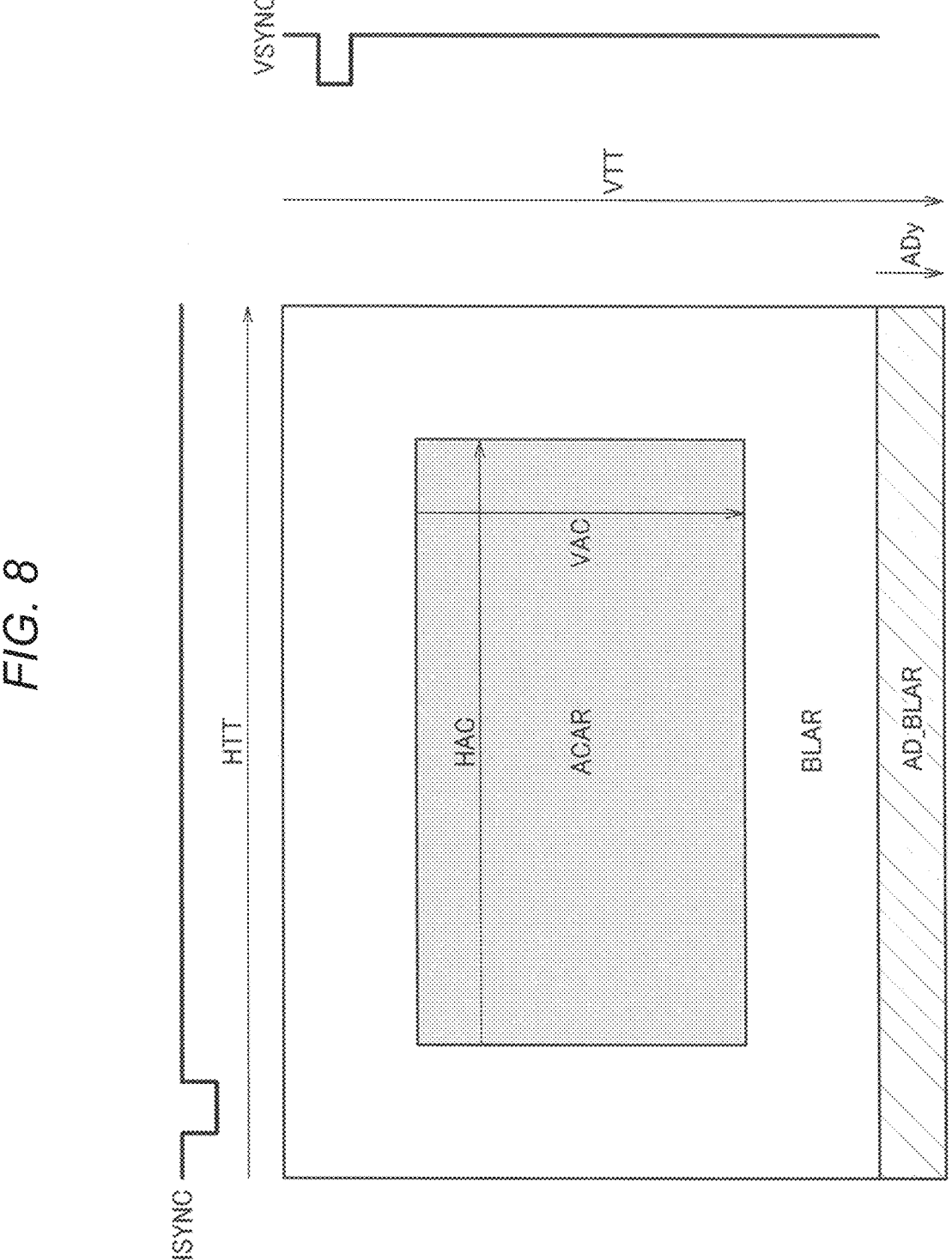
FIG. 8 shows first example of frame rate adjustment.
Figure 9:
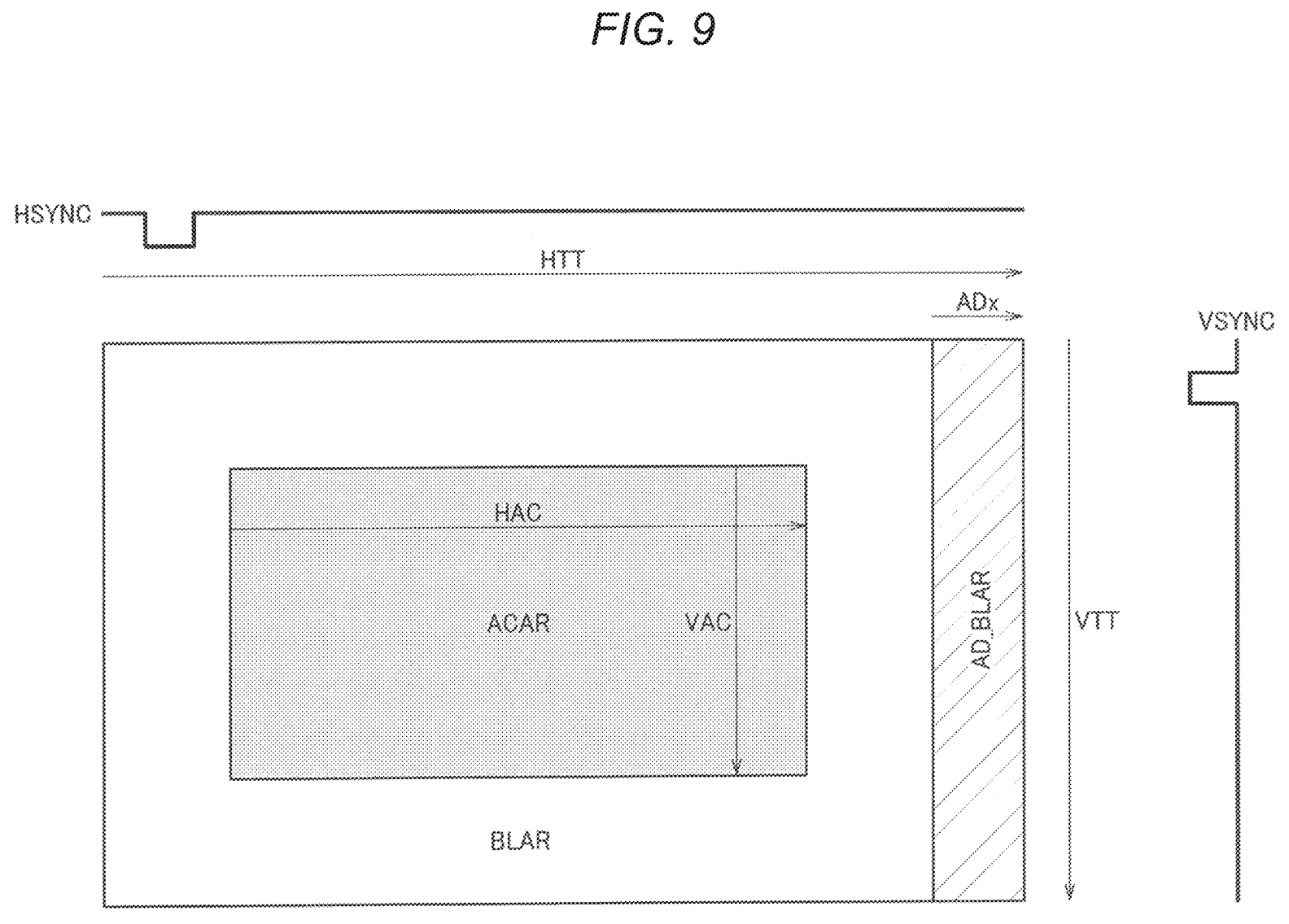
Figure 10:
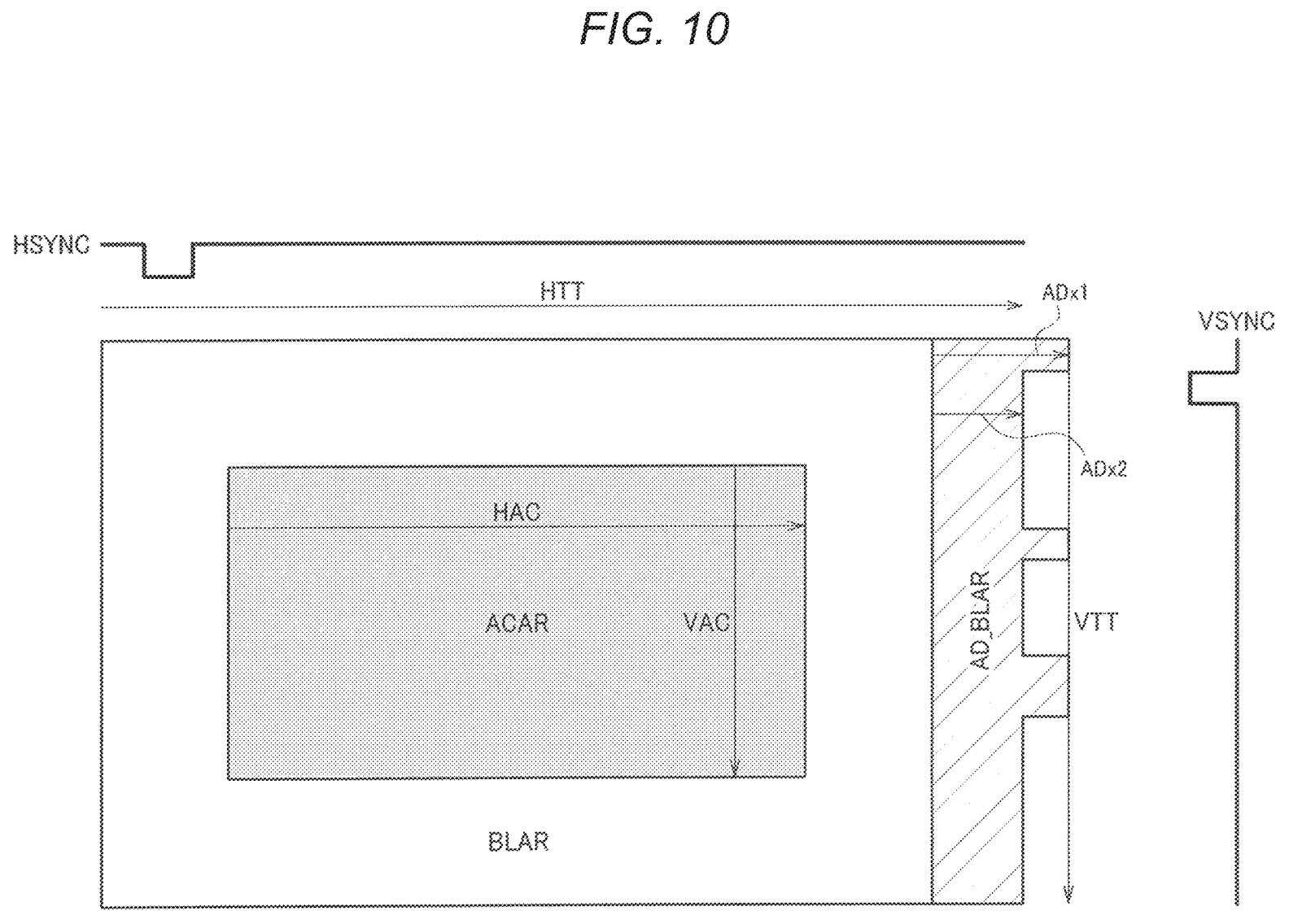
Figure 11:
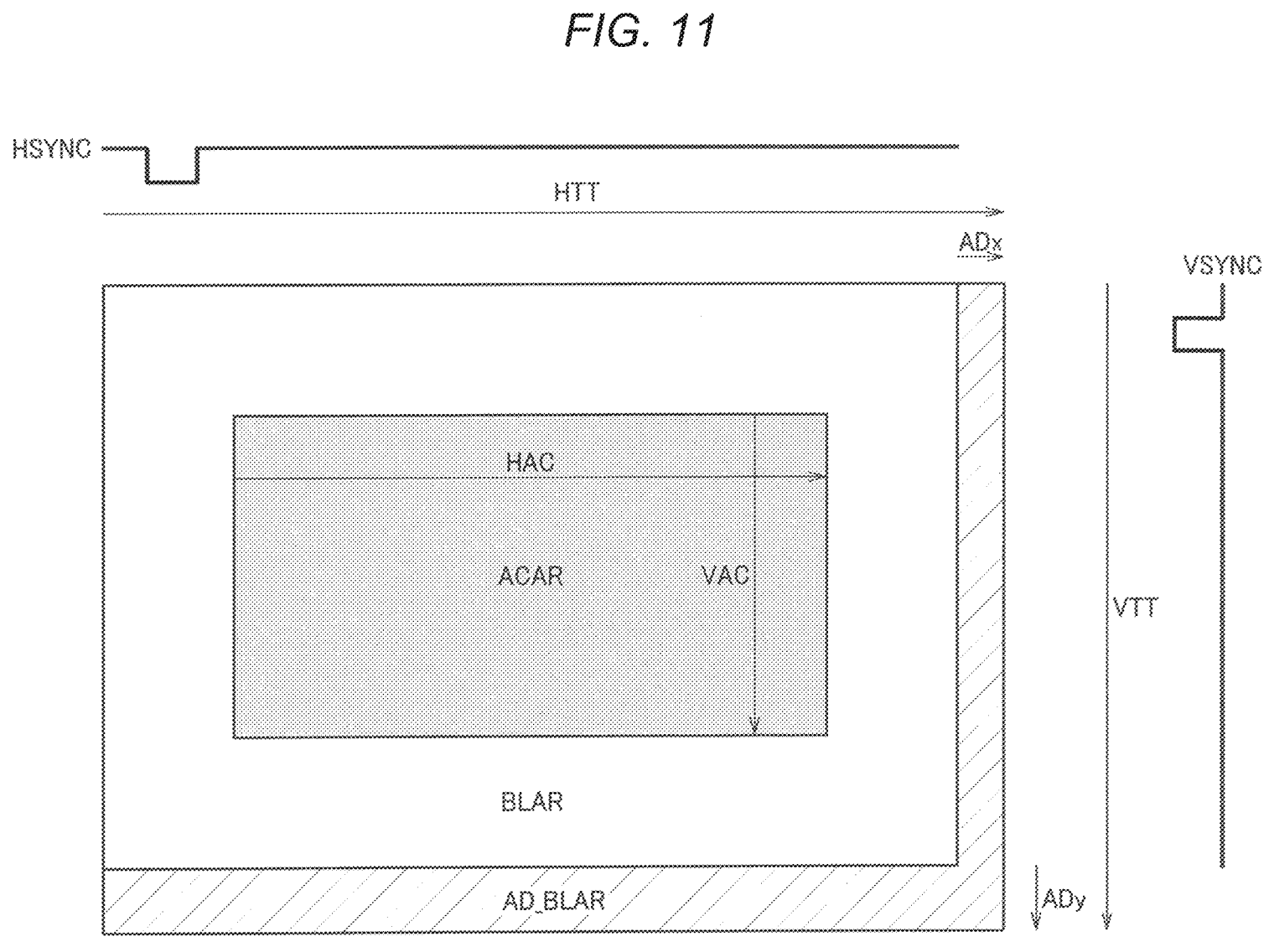
Figure 12:
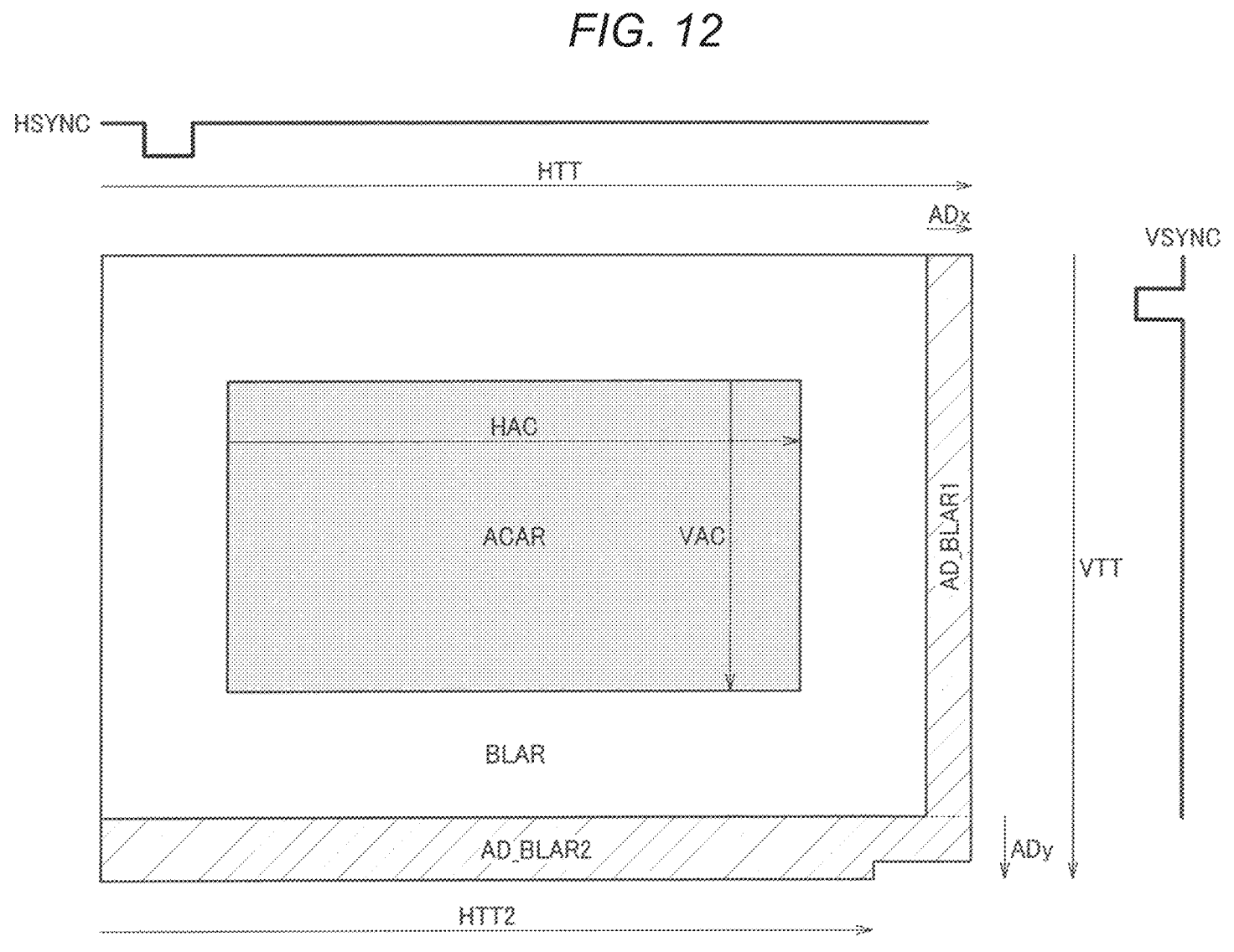

The length of the vertical blanking period is adjusted in FIG. 8, the length of the horizontal blanking period is adjusted in FIG. 9 and FIG. 10, and the length of the vertical blanking period and the length of the horizontal blanking period are adjusted in FIG. 11 and FIG. 12.

In the embodiment, when the first selection circuit 150 selects any of the first image data IMA, the switching image data IMX, and the second image data IMB, the output circuit 130 may output the output image data IMQ based on a dot clock signal of the same frequency. "The output image data IMQ is output based on the dot clock signal of the same frequency" means, for example, that the output image data IMQ is output based on the same common dot clock signal regardless of what image data is selected.

According to the embodiment, when switching the first image data IMA, the switching image data IMX, and the second image data IMB, the output circuit 130 controls a display timing based on the dot clock signal of the same frequency. Accordingly, even when the first image data IMA and the second image data IMB are asynchronous with each other, an image is switched in the vertical blanking period due to display timing control managed based on the dot clock signal of the same frequency in the output image data IMQ.

3. Frame Rate Adjustment

Hereinafter, examples of frame rate adjustment performed by the synchronization signal generation circuit 133 will be described.

Figure 7:
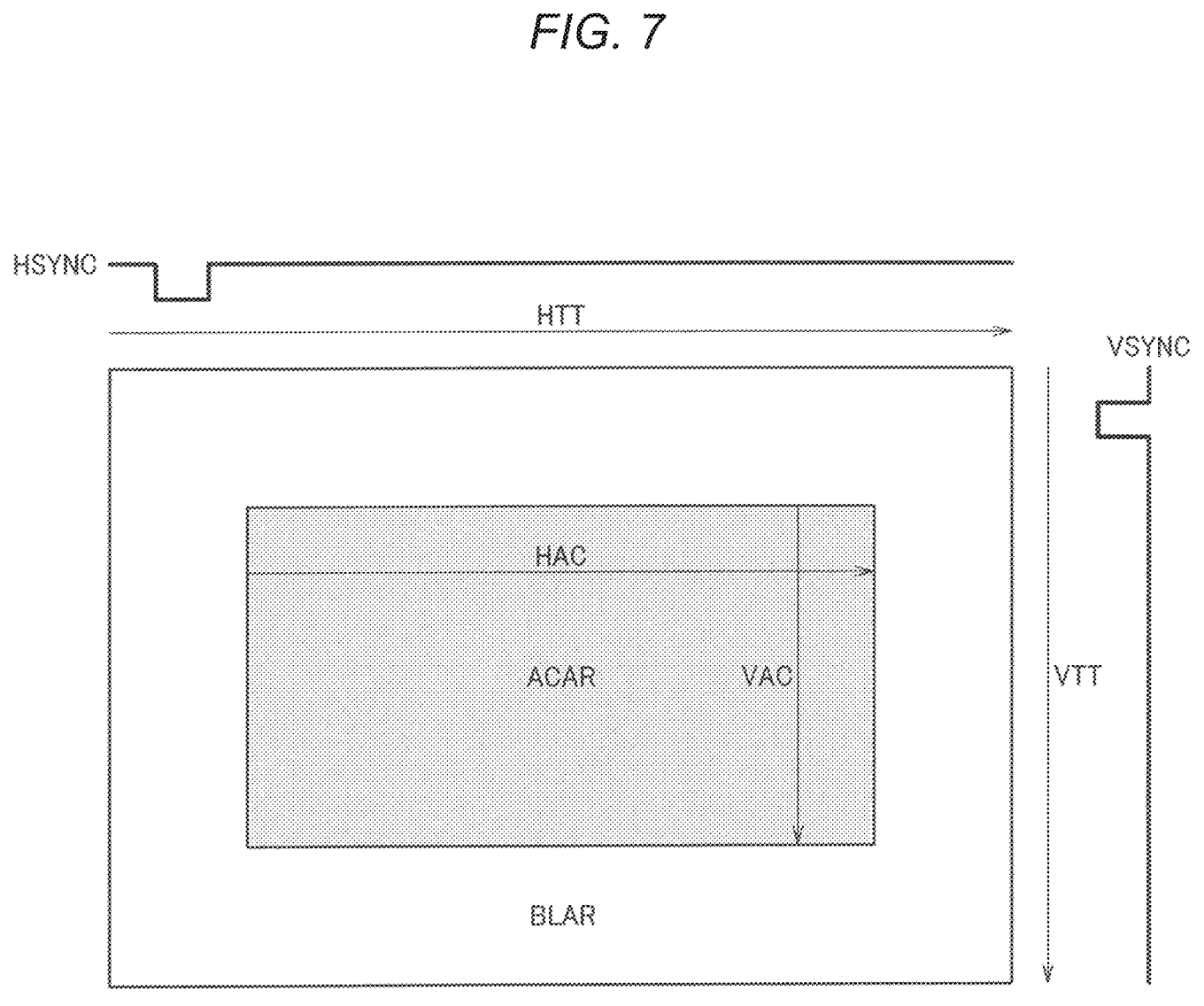

FIG. 7 shows an example of image data whose frame rate is not adjusted. HSYNC indicates a horizontal synchronization signal, and VSYNC indicates a vertical synchronization signal. Here, the image data is shown as two-dimensional data corresponding to a display state, HSYNC is shown in association with a horizontal scanning direction and VSYNC is shown in association with a vertical scanning direction in the display state. An area and a period of the two-dimensional data can be associated through a dot clock cycle. Hereinafter, the area and the period may be described without distinction.

An active area ACAR shown in FIG. 7 is an area displayed on the display apparatus 200. The number of horizontal active pixels HAC is the number of pixels in the active area ACAR in the horizontal scanning direction. The number of vertical active pixels VAC is the number of pixels in the active area ACAR in the vertical scanning direction.

A blanking area BLAR is an area other than the active area ACAR among all areas corresponding to a frame, and includes a horizontal blanking period and a vertical blanking period. The horizontal blanking period is a period other than an active period in a horizontal scanning period in which the active area ACAR exists. The vertical blanking period is a period in which the active area ACAR does not exist in a vertical scanning period. The total number of horizontal pixels HTT is the number of pixels in the horizontal scanning direction in all areas including the blanking area BLAR and the active area ACAR. The total number of vertical pixels VTT is the number of pixels in the vertical scanning direction in all areas including the blanking area BLAR and the active area ACAR.

FIG. 8 is a first example of the frame rate adjustment. The synchronization signal generation circuit 133 decreases the frame rate of the switching image data IMX by increasing the total number of vertical pixels VTT.

AD_BLAR indicates an increment in the blanking area BLAR. The number of pixels of the increment AD_BLAR in the horizontal scanning direction is the total number of horizontal pixels HTT. When the number of pixels of the increment AD_BLAR in the vertical scanning direction is referred to as ADy, the vertical scanning period is increased by HTT×ADy×(dot clock cycle). Accordingly, the frame rate decreases.

The adjustment data 181 may be, for example, data indicating the total number of vertical pixels VTT or data indicating the number of pixels ADy of the increment AD_BLAR in the vertical scanning direction.

FIG. 9 is a second example of the frame rate adjustment. The synchronization signal generation circuit 133 decreases the frame rate of the switching image data IMX by increasing the total number of horizontal pixels HTT.

The number of pixels of the increment AD_BLAR in the vertical scanning direction is the total number of vertical pixels VTT. When the number of pixels of the increment AD_BLAR in the horizontal scanning direction is referred to as ADx, the vertical scanning period is increased by ADx×VTT×(dot clock cycle). Accordingly, the frame rate decreases.

The adjustment data 181 may be, for example, data indicating the total number of horizontal pixels HTT or data indicating the number of pixels ADx of the increment AD_BLAR in the horizontal scanning direction.

FIG. 10 is a third example of the frame rate adjustment. The synchronization signal generation circuit 133 increases the total number of horizontal pixels HTT and combines a plurality of total numbers of horizontal pixels HTT to decrease the frame rate of the switching image data IMX.

The number of pixels of the increment AD_BLAR in the vertical scanning direction is the total number of vertical pixels VTT. The number of pixels of the increment AD_BLAR in the horizontal scanning direction differs in each horizontal scanning period. In the example in FIG. 10, the number of pixels of the increment AD_BLAR in each horizontal scanning period is ADx1 or ADx2. ADx1 and ADx2 are different. However, the number of pixels of the increment AD_BLAR in each horizontal scanning period may be any of three or more numbers of pixels. Since the vertical scanning period increases by (total number of pixels of AD_BLAR)×(dot clock cycle), the frame rate decreases. By combining the plurality of total numbers of horizontal pixels HTT, the frame rate can be finely adjusted as compared to FIG. 8 and FIG. 9.

The adjustment data 181 may be, for example, data indicating the total number of horizontal pixels HTT in each horizontal scanning period, or data indicating the number of pixels of the increment AD_BLAR in the horizontal scanning direction in each horizontal scanning period.

FIG. 11 is a fourth example of the frame rate adjustment. The synchronization signal generation circuit 133 decreases the frame rate of the switching image data IMX by increasing the total number of horizontal pixels HTT and the total number of vertical pixels VTT.

The number of pixels of the increment AD_BLAR in the horizontal scanning direction is ADx, and the number of pixels of the increment AD_BLAR in the vertical scanning direction is ADy. Since the vertical scanning period increases by HTT×VTT−{(HTT−ADx)×(VTT−ADy)}×(dot clock cycle), the frame rate decreases.

The adjustment data 181 may be, for example, data indicating the total number of horizontal pixels HTT and the total number of vertical pixels VTT, or may be data indicating the number of pixels ADx of the increment AD_BLAR in the horizontal scanning direction and the number of pixels ADy of the increment AD_BLAR in the vertical scanning direction.

FIG. 12 is a fifth example of the frame rate adjustment. The synchronization signal generation circuit 133 increases the total number of horizontal pixels HTT and the total number of vertical pixels VTT, and combines a plurality of total numbers of horizontal pixels HTT to decrease the frame rate of the switching image data IMX.

AD_BLAR1 and AD_BLAR2 indicate the increment of the blanking area BLAR. AD_BLAR1 is an area corresponding to an increase in the total number of horizontal pixels HTT. The number of pixels of the increment AD_BLAR1 in the horizontal scanning direction is ADx. AD_BLAR2 is an area corresponding to an increase in the total number of vertical pixels VTT. The number of pixels of the increment AD_BLAR2 in the vertical scanning direction is ADy. However, a horizontal scanning period in which the total number of horizontal pixels is HTT and a horizontal scanning period in which the total number of horizontal pixels is HTT2 co-exist in the increment AD_BLAR2. FIG. 12 shows an example in which the total number of horizontal pixels is HTT2 in a last horizontal scanning period. Here, HTT2<HTT. FIG. 12 shows an example in which HTT−HTT2>ADx, and alternatively, HTT−HTT2≤ADx may be satisfied.

The adjustment data 181 may be, for example, data indicating the total number of horizontal pixels HTT, the total number of vertical pixels VTT, and the total number of horizontal pixels HTT2 in the last horizontal scanning period. Alternatively, the adjustment data 181 may be data indicating the number of pixels ADx of the increment AD_BLAR in the horizontal scanning direction, the number of pixels ADy of the increment AD_BLAR in the vertical scanning direction, and the total number of horizontal pixels HTT2 in the last horizontal scanning period.

Although the embodiment is described in detail above, those skilled in the art could easily understand that many modifications are possible without substantially departing from the novel matters and the effects of the present disclosure. Therefore, all such modifications are included in the scope of the present disclosure. For example, a term described at least once together with a different term having a broader meaning or the same meaning in the specification or the drawings can be replaced with the different term at any place in the specification or the drawings. All combinations of the embodiment and the modifications are also included in the scope of the present disclosure. The configurations and operations of the electronic device, the display system, the display apparatus, the circuit apparatus, the first apparatus, the second apparatus, the first input circuit, the second input circuit, the frame memory, the selection circuit, the output circuit, the control circuit, and the register are not limited to those described in the embodiment, and various modifications can be made.

What is claimed is:
1. A circuit apparatus comprising:
 a first input circuit configured to receive first image data;

a second input circuit configured to receive second image data;

a frame memory configured to store the second image data as switching image data;

a first selection circuit configured to select any of the first image data, the second image data, and the switching image data and output the selected image data as first selected image data;

an output circuit configured to output image data based on the first selected image data; and a control circuit, wherein the control circuit controls the first selection circuit to switch from the first image data to the switching image data in a vertical blanking period of the first image data, controls the output circuit to output the output image data at a frame rate different from a frame rate of the second image data in a switching period in which the switching image data is selected by the first selection circuit, and controls the first selection circuit to switch from the switching image data to the second image data in an overlap period between a vertical blanking period of the switching image data and a vertical blanking period of the second image data.

2. The circuit apparatus according to claim 1, further comprising:

a compression circuit configured to compress the second image data, wherein the frame memory stores, as the switching image data, the second image data compressed by the compression circuit.

3. The circuit apparatus according to claim 2, further comprising:

a decompression circuit configured to decompress the switching image data stored in the frame memory and output the decompressed switching image data to the first selection circuit.

4. The circuit apparatus according to claim 1, wherein the control circuit sets a frame rate of the switching image data to a frame rate lower than the frame rate of the second image data.

5. The circuit apparatus according to claim 1, further comprising:

a second selection circuit configured to select any of the first image data and the second image data and output the selected image data as second selected image data, wherein the frame memory stores the second selected image data as the switching image data.

6. The circuit apparatus according to claim 5, wherein the second selection circuit selects the first image data as the second selected image data when the first selection circuit switches from the second image data to the first image data, and the control circuit controls the first selection circuit to switch from the second image data to the switching image data in the vertical blanking period of the second image data, sets a frame rate of the switching image data to a frame rate different from a frame rate of the first image data in the switching period, and controls the first selection circuit to switch from the switching image data to the first image data in an overlap period between the vertical blanking period of the switching image data and the vertical blanking period of the first image data.

7. The circuit apparatus according to claim 1, wherein the control circuit sets a frame rate of the switching image data by adjusting a length of the vertical blanking period, a length of a horizontal blanking period, or the length of the vertical blanking period and the length of the horizontal blanking period of the switching image data in the switching period.

8. The circuit apparatus according to claim 7, further comprising:

a register configured to store adjustment data of the frame rate of the switching image data, wherein the control circuit sets the length of the vertical blanking period, the length of the horizontal blanking period, or the lengths of the vertical blanking period and the horizontal blanking period of the switching image data based on the adjustment data in the switching period.

9. The circuit apparatus according to claim 1, wherein when the first selection circuit selects any of the first image data, the switching image data, and the second image data, the output circuit outputs the output image data based on a dot clock signal of the same frequency.

10. A display system comprising:

the circuit apparatus according to claim 1; and a display apparatus configured to display an image based on the output image data.

* * * * *